US008214434B2

(12) United States Patent
McColgan et al.

(10) Patent No.: US 8,214,434 B2
(45) Date of Patent: Jul. 3, 2012

(54) SYSTEM AND METHOD FOR CONFLICT RESOLUTION DURING THE CONSOLIDATION OF INFORMATION RELATING TO A DATA SERVICE

(75) Inventors: Brian McColgan, Mississauga (CA); Gaelle Martin-Cocher, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 274 days.

(21) Appl. No.: 12/421,435

(22) Filed: Apr. 9, 2009

(65) Prior Publication Data

US 2010/0262809 A1 Oct. 14, 2010

(51) Int. Cl.
*G06F 15/16* (2006.01)

(52) U.S. Cl. ...................................................... 709/204

(58) Field of Classification Search .......... 709/201–207, 709/242–253, 213–219, 225–238
See application file for complete search history.

(56) References Cited

U.S. PATENT DOCUMENTS

| | | | |
|---|---|---|---|
| 7,243,149 B2 * | 7/2007 | Kelley et al. .................. | 709/224 |
| 2004/0054726 A1 | 3/2004 | Doss et al. | |
| 2005/0135240 A1 * | 6/2005 | Ozugur ........................ | 370/229 |
| 2005/0262195 A1 * | 11/2005 | Ono et al. ..................... | 709/203 |
| 2006/0075432 A1 * | 4/2006 | Abbadessa et al. ............. | 725/46 |
| 2006/0117050 A1 * | 6/2006 | John et al. .................... | 707/101 |
| 2006/0190591 A1 * | 8/2006 | Bobde et al. .................. | 709/224 |
| 2006/0248185 A1 * | 11/2006 | Morris .......................... | 709/224 |
| 2007/0003051 A1 * | 1/2007 | Kiss et al. ................. | 379/265.02 |
| 2007/0036137 A1 * | 2/2007 | Horner et al. .................. | 370/352 |
| 2007/0078968 A1 * | 4/2007 | Kelley et al. ................... | 709/224 |
| 2007/0168424 A1 | 7/2007 | Oh et al. | |
| 2007/0233798 A1 * | 10/2007 | Kelley et al. ................... | 709/206 |
| 2007/0233859 A1 * | 10/2007 | Zhao et al. .................... | 709/224 |
| 2008/0010301 A1 * | 1/2008 | Tian et al. ........................ | 707/10 |
| 2008/0068371 A1 * | 3/2008 | Sun et al. ........................ | 345/418 |
| 2008/0098297 A1 * | 4/2008 | Sun et al. ........................ | 715/234 |
| 2008/0126360 A1 * | 5/2008 | Kakuta et al. .................... | 707/10 |
| 2008/0133645 A1 * | 6/2008 | Fridman et al. ................ | 709/202 |
| 2008/0133674 A1 * | 6/2008 | Knauerhase et al. ......... | 709/206 |
| 2008/0240384 A1 | 10/2008 | Suryanarayana et al. | |
| 2008/0313329 A1 * | 12/2008 | Wang et al. .................... | 709/224 |
| 2009/0077199 A1 * | 3/2009 | Emori ........................... | 709/218 |
| 2009/0254627 A1 * | 10/2009 | Morris .......................... | 709/206 |
| 2009/0268889 A1 * | 10/2009 | Fukazawa .................. | 379/93.25 |
| 2009/0307349 A1 * | 12/2009 | Harris et al. .................. | 709/224 |

(Continued)

FOREIGN PATENT DOCUMENTS

EP 1396988 A2 3/2004

(Continued)

OTHER PUBLICATIONS

European Examination Report; Application No. 09160569.4; Feb. 24, 2011; 7 pgs.

(Continued)

*Primary Examiner* — Asad Nawaz
(74) *Attorney, Agent, or Firm* — Conley Rose, P.C.; J. Robert Brown, Jr.

(57) ABSTRACT

A context aware mechanism including a system configured to receive presence data relating to at least one of a presentity and a watcher, and to resolve a conflict that arises during processing of the presence data according to a criteria. A method is also provided.

23 Claims, 5 Drawing Sheets

U.S. PATENT DOCUMENTS

| | | | |
|---|---|---|---|
| 2010/0070626 A1* | 3/2010 | McColgan et al. | 709/224 |
| 2010/0088365 A1 | 4/2010 | Varney | |
| 2011/0087778 A1* | 4/2011 | Knauerhase et al. | 709/224 |
| 2011/0131629 A1* | 6/2011 | Oh et al. | 726/1 |

FOREIGN PATENT DOCUMENTS

| | | |
|---|---|---|
| EP | 1463269 A2 | 9/2004 |
| WO | 2007066989 A1 | 6/2007 |

OTHER PUBLICATIONS

Nishigaki, Kouji et al.; "Framework and Rule-based Language for Facilitating Context-aware Computing using Information Appliances"; Proceedings of the 25th IEEE International Conference on Distributed Computing Systems Workshops (ICDCSW '05); 7 pgs.

Yang, Kun et al.; "Policy-Driven Mobile Agents for Context-Aware Service in Next Generation Networks"; 2003; 10 pgs.; XP002342567; University College London, Department of Electronic & Electrical Engineering, Torrington Place, London WCIE 7JE, UK.

Xi, Min et al; "An Offset Algorithm for Conflict Resolution in Context-Aware Computing"; 2007; 10 pgs.; Springer-Verlag Berlin Heidelberg.

Brodt, Andreas et al.; "Context-Aware Mashups for Mobile Devices"; 2008; 12 pgs.; Springer-Verlag Berlin Heidelberg.

McColgan, Brian, et al.; U.S. Appl. No. 12/333,710, filed Dec. 12, 2008; Title: Method and System for a Context Aware Mechanism for Use in Presence and Location.

McColgan, Brian, et al.; U.S. Appl. No. 12/333,756, filed Dec. 12, 2008; Title: Method and System for a Context Aware Mechanism in an Integrated or Distributed Configuration.

McColgan, Brian, et al.; U.S. Appl. No. 12/333,784, filed Dec. 12, 2008; Title: Method and System for Specifying, Applying and Extending Application Related Aspects Through Policies, Roles and/or Triggers.

Schulzrinne, H., et al.; Title: Common Policy: A document Format for Expressing Privacy Preferences; Network Working Group; RFC 4745; Feb. 2007; 33 pgs.

Extended European Search Report; EP Patent Application No. 09160596.4; Aug. 21, 2009; 8 pgs.

Brodt, Andreas, et al.; Title: Context-Aware Mashups for Mobile Devices; Web Information Systems Engineering—Wise 2008; vol. 5175; Sep. 1, 2008; pp. 280-291.

Xi, Min, et al.; Title: An Offset Algorithm for Conflict Resolution in Context-Aware Computing; Ubiquitous Intelligence and Computing; vol. 4611; Jul. 11, 2007; pp. 878-887.

Nishigaki, Kouji, et al.; Title: Framework and Rule-Based Language for Facilitating Context-Aware Computing using Information Appliances; 25th IEEE International Conference; Jun. 6, 2005; pp. 345-351.

Yang; Kun, et al.; Title: Policy-Driven Mobile Agents for Context-Aware Service in Next Generation Networks; Lecture Notes in Computer Science; vol. 2881; Jan. 1, 2003; pp. 111-120.

PCT International Search Report; PCT Application No. PCT/CA2010/000480; Jul. 13, 2010; 5 pgs.

PCT Written Opinion of the International Searching Authority; PCT Application No. PCT/CA2010/000480; Jul. 13, 2010; 8 pgs.

International Preliminary Report on Patentability; Application No. PCT/CA2010/000480; Aug. 11, 2011; 14 pages.

\* cited by examiner

SYSTEM AND METHOD FOR CONFLICT RESOLUTION DURING THE CONSOLIDATION OF INFORMATION RELATING TO A DATA SERVICE

BACKGROUND

Some user agents (UAs), such as mobile telecommunications devices, can collect presence information associated with the user of the user agent. The presence information might include the user's location, the user's availability, the user's willingness to communicate, the user's willingness to use a particular service or communication method, the user's state of mind, activities the user is currently engaged in, applications currently executing on the user's UA, and similar data that relates to the current state of the user and/or the UA. An entity that has presence information associated with it, such as a human user of a UA, can be referred to as a presentity. A presentity might also be a non-human entity, such as an application executing on a UA. An entity that provides presence information on behalf of one or more presentities can be referred to as a presence source. For example, a UA that provides presence information associated with its user could be a presence source. When a presence source is associated with only one presentity, the presence source and the presentity could be considered equivalent.

A presence source that has collected presence information about a presentity might transmit the presence information to an entity that can be referred to as a presence server. The presence server might then provide the presence information to an entity that wishes to consume the presence information. This entity can be referred to as a watcher. As an example, if a presentity "Bob" has consented to allow other users to have access to information about his current location, Bob's UA might transmit his location information to a presence server. If a watcher "Alice" wished to learn Bob's current location, Alice's UA might submit an appropriate request to the presence server, and the presence server might send presence information about Bob to Alice's UA. Alice's UA might then process the presence information to determine Bob's location.

As used herein, the terms "user agent" and "UA" might in some cases refer to mobile devices such as mobile telephones, personal digital assistants, handheld or laptop computers, and similar devices that have telecommunications capabilities. Such a UA might include a UA device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might include the UA device itself without such a module. In other cases, the term "UA" might refer to devices that have similar capabilities but are not transportable, such as desktop computers, set-top boxes, or network appliances. The term "UA" can also refer to any hardware or software component that can terminate a communication session for a user. Also, the terms "user agent," "UA," "user equipment," "UA," "user device" and "user node" might be used synonymously herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated herein, but may be modified within the scope of the appended claims along with their full scope of equivalents.

The embodiments are directed generally to methods and devices for tracking, manipulating, and disseminating presence data. Presence data relates to information concerning where a person is, whether the person is available, the manner in which the person can be contacted, and/or other such information. More particularly, the embodiments described herein provide techniques for handling conflict resolution within a context aware mechanism.

While processing presence data in a context aware mechanism, conflicts commonly arise from one of two sources: conflicts among data, and conflicts among rules, policies, or triggers. Conflicts among data may arise due to receiving data from different data sources, each of which provide different values for the same data. Conflicts among rules may arise when two or more rules require contradictory results or contradictory instructions, or contradict one another (i.e. Rule A contradicts Rule B).

As an example of conflicts among data, a first data source reports that Bob is located in the kitchen, but a second data source reports that Bob is located in the office. Bob cannot both be in the office and the kitchen. However, one or more of rules, policies, triggers, context data, or metadata can be used to establish a criteria that allows resolution of the conflict, thereby determining where Bob is most likely to be located or how location should be reported with respect to Bob. The criteria can be further adjusted by other factors, such as by time, user, user group, or many other possible factors. Thus, in an example using time, if the first data source is using data that is an hour old, but the second data source is using data that is five minutes old, then the second data source can be weighted and prioritized accordingly so that Bob is more likely to be reported as being in the office. Criteria may be established using a priority specifier, any convenient form of data or metadata, rules, policies, triggers, and/or computer usable code.

In another non-limiting example of conflicts among rules, Rule A provides that data from location X should be ignored; however, Rule B provides that data from location X should be given a high weight during processing. Again, the presence aware mechanism can use the criteria to resolve the conflict.

In an example, the conflict is resolved by picking Rule A over Rule B. In another example, the conflict is resolved by providing for a third rule, Rule C, which is different than either Rule A or Rule B or which provides logic to resolve the conflict between Rule A and Rule B.

Other, non-limiting examples of conflicts and their resolutions are provided below with respect to the various drawings. Additionally, the conflict resolution techniques described herein are not limited to only conflicts among data and conflicts among rules, policies, or triggers.

Figure 1:
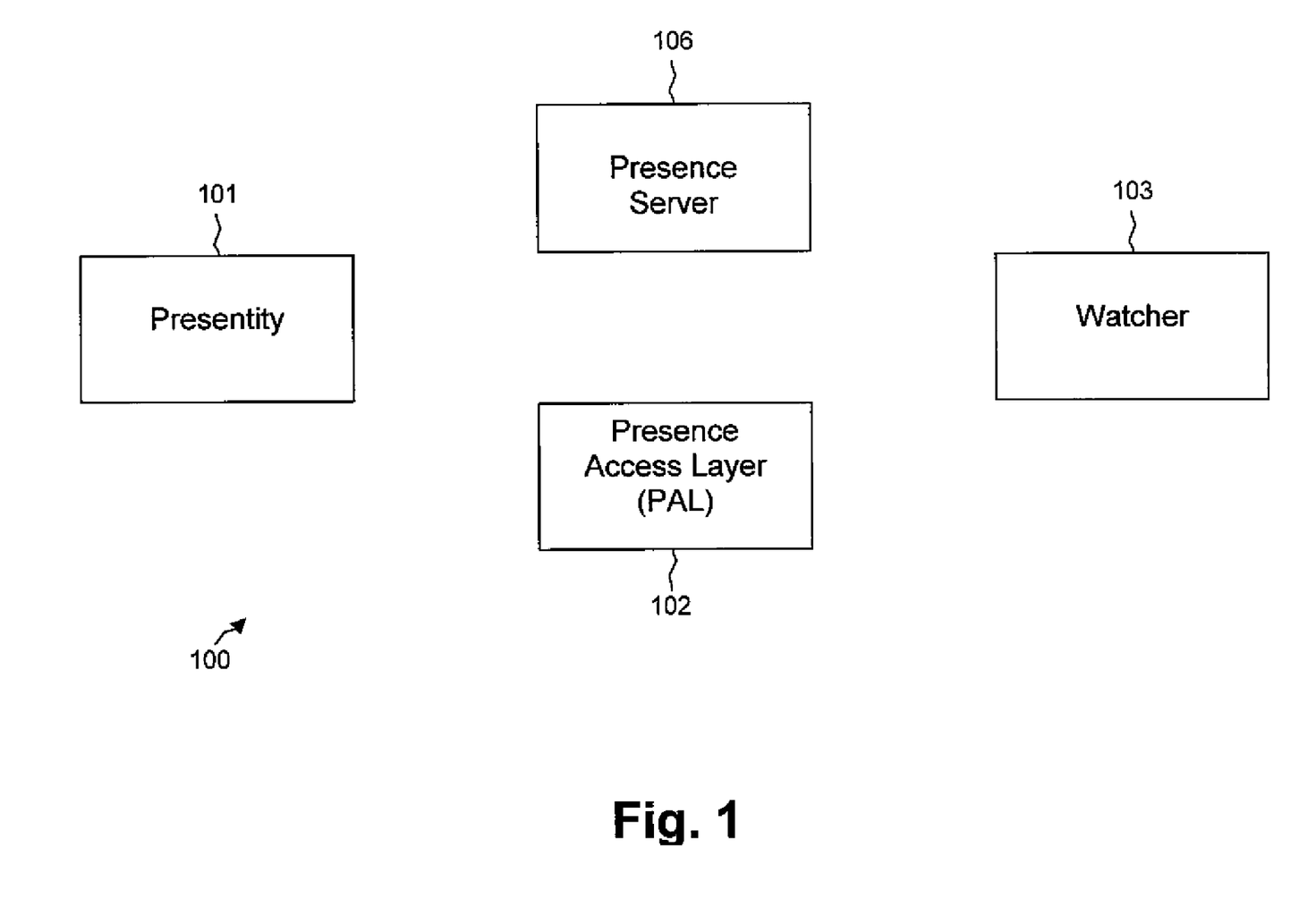
FIG. 1 is a block diagram of a communications system according to an embodiment of the disclosure.

FIG. 1 is a block diagram of an embodiment of a system 100 that includes one or more presentities 101, one or more watchers 103, and a presence server 106. In some cases, a presence access layer (PAL) 102, as described below, might also be present. The PAL 102 might reside wholly or partially in the presence server 106, in the presentity 101, in the watcher 103, in one or more services or applications, and/or in one or more other network components. The functionality provided by the PAL 102 may be divided between these and/or other components. Alternatively, the PAL 102 might be a standalone component.

As mentioned above, the presentity 101 might be a human or non-human entity with which presence information is associated. The presentity 101 might reside wholly or partially on a UA or wholly or partially in a network or on a network component. Although not shown, multiple presence sources that capture presence information on behalf of the presentity 101 might be present. Multiple presentities 101 might also be present, and a single presence source might be associated with multiple presentities 101 and/or a single presentity 101 might be associated with multiple presence sources. Hereinafter, the term "presentity" might refer only to one or more presentities 101 or might refer to one or more presentities 101 and one or more associated presence sources. That is, no distinction will be made between a presentity and a presence source, but it should be understood that in some cases these can be separate entities.

The watcher 103 might be one or more humans, applications, services, or other entities that monitor or wish to consume presence information associated with the presentity 101. When the watcher 103 is an application or a service, the application or service might be wholly or partially resident on a UA. Alternatively, the application or service might be wholly or partially resident on a network component. Hereinafter, the term "watcher" might refer to a human, an application, or a service interested in presence information, to a UA or network component on which such an application or service resides, or to any combination of these entities.

The presentity 101 might be able to define which watchers 103 can receive the presentity's presence information and which presence information the watchers 103 can receive. As an example, the presentity user "Bob" might specify that all of his work supervisors can receive all of his presence information. He might also specify that the watcher "Alice" can receive information about his current willingness to communicate but can receive none of his other presence information, such as his current location. Alternatively or in combination with the above, another entity, such as Bob's employer, might designate which elements of Bob's presence information will be made available to which watchers 103. This embodiment may also apply to a service provider, or a principal administrator of a presence platform, where the service provider or the principal administrator specifies what elements can be shared.

A plurality of applications or services, such as instant messaging services or push-to-talk services, might be associated with the presentity 101, and these applications or services might be provided by one or more devices. The presentity 101 might publish presence information from a plurality of these devices. For example, Bob might be using a desktop computer and a handheld telephone simultaneously and may be considered available on either device. If Bob did not use the computer for an extended period of time, the computer might enter a sleep mode, and Bob might become unavailable on that device. However, he might remain available on the handset.

The presentity 101 can publish its presence information to the presence server 106. Only certain portions of the presence information might be made available to the watchers 103, and only certain watchers 103 might have access to the presence information. The presentity 101 or a third party (for example, a service provider or administrator) might publish rules or policies to the presence server 106 that define the portions of the presence information that will be made available to the watchers 103 and which of the portions will be made available to which of the watchers 103. The rules or polices might be established for groups of presentities 101 and/or groups of watchers 103. The rules or polices might be provided to the presence server 106 in a policy document. Alternatively, the presence information that will be made available to a particular watcher 103 might be determined at the time that watcher 103 requests presence information, possibly in combination with other factors. For example, a policy may be used to further narrow the presence information distributed at request time.

As used herein, the term "rule" refers to a sequence of logic that, when executed, can specify actions. The term "policy" refers to logic that can aid in the evaluation of a rule by, for example, providing hints or guidance, clarifying indeterminate or inconclusive scenarios during processing, or providing parameters. A distinction might also be made between a rule and a base rule and between a policy and a base policy. A base rule is typically a common interoperable rule or a default rule. That is, a base rule is a rule that is specified when no specific service or platform has overridden or changed it. Therefore, the term "rule" could refer to any rule, base or otherwise. Similarly, the term "policy" could refer to the set of all policies, and the term "base policy" could refer to a common or default policy that is used when a policy has not been overridden, extended, or enhanced.

The presence server 106 is a network component that receives presence information from the presentity 101 and provides presence information to the watcher 103. The rules or policies that define the presence information that will be made available to the watchers 103 might be stored on and/or processed by the presence server 106. When the watcher 103 wishes to receive presence information associated with the presentity 101, the watcher 103 can send a request to the presence server 106. The presence server 106 can then determine if the watcher 103 is authorized to receive the presentity's presence information. If the watcher 103 is authorized, the presence server 106 sends the presence information to the watcher 103.

Upon receiving the presence document, the watcher 103 parses the XML or other encoding scheme to extract the desired presence information. The entire presence document is typically parsed, regardless of the amount of presence information that is sought. For example, if the watcher 103 wished to learn the presentity's current willingness to communicate, the watcher 103 might need to sift through large amounts of unrelated data, such as the presentity's location, the presentity's willingness to use a particular service, the applications currently executing on the presentity's UA, and other information, to find the single data element that is desired.

In some cases, the watcher 103 might wish to learn a combination of information about the presentity 101. For example, if the watcher 103 wanted to send an instant message to the presentity 101, the watcher 103 might first attempt to determine the presentity's willingness to communicate and whether an instant messaging application is currently executing on the presentity's UA. In such cases, the watcher 103 might again send a single request for presence information to the presence server 106 and might again receive the entire presence document. The watcher 103 would then parse the entire document to find the plurality of data elements that are desired and perform the appropriate logical operations to correlate the data elements and derive the combination of information that was desired.

It may be possible that the presentity 101 did not specify whether or not the watcher 103 could have access to a data element that the watcher 103 is trying to obtain. It may also be possible that the presentity did not publish the data element, in which case the data element is missing or may not be available. In that case, the presence document may not contain the information that the watcher 103 is seeking. In such a case, the results of the watchers parsing of the presence document may be indeterminate and the further actions the watcher 103 should take may not be clear.

In some cases, the system 100 may be configured with PAL 102 such that more efficient processing and dissemination of presence information is provided. The PAL 102 can abstract and simplify complex presence information on behalf of the watcher 103. That is, the PAL 102 can act as a proxy for the watcher 103 by: receiving a presence information request from the watcher 103; sending the request to the presence server 106; receiving a presence document from the presence server 106; parsing the information in the presence document; and returning to the watcher 103 a single value, such as "true" or "false", as a response to the presence information request.

The PAL 102 allows the watcher 103 to submit a request for a single element of presence information, which can be referred to as a presence aspect. In addition, the presence aspect or aspects may represent simple presence information elements, such as availability, or more complex indications based on the correlated abstractions, as described above. For example, the presentity's willingness to communicate might be a presence aspect, the presentity's current location might be another, the presentity's preferred means of communication might be another, and so on. The presence aspects are reusable, interoperable abstractions that can be applicable across a plurality of applications or services. The watcher 103 can send a message to the PAL 102 specifying a single presence aspect for which the watcher 103 is seeking information. The PAL 102 can then respond with information related only to that presence aspect such that the watcher 103 need not parse process or otherwise deal with a presence document.

As an example, if the watcher 103 wishes to learn whether the presentity 101 is currently willing to communicate, the watcher 103 can submit a request to the PAL 102 for information specifically about presence aspect willingness. If the presentity 101 has specified that the watcher 103 can have access to the presentity's willingness information, the PAL 102 can respond with a single value indicating the presentity's willingness or unwillingness to communicate (e.g. willing is 'true' or unwilling is 'false'). The watcher 103 then needs to process only this single value. This can be contrasted with the situation where the PAL 102 is not present. In that case, the watcher 103 would ask for presence information in general, receive the entire presence document, and parse the presence document to determine the willingness aspect.

The PAL 102 can also process more complex requests from the watcher 103. For example, if the watcher 103 wished to determine a combination of information associated with the presentity 101, the watcher 103 might send the PAL 102 a request for each desired presence aspect. The PAL 102 might then return a response for each of the requests. Alternatively, the PAL 102 might correlate multiple presence aspects and return a single value to the watcher 103 that represents the combination of information that the watcher 103 was seeking.

In addition to greatly simplifying the manner in which the watcher 103 requests, receives, and processes presence information, use of the PAL 102 allows processing that might previously have been performed by the watcher 103 to be offloaded to the PAL 102. In the cases where the PAL 102 is a standalone component or resides wholly or partially in the presence server 106 or some other network component, offloading the processing of presence information to the PAL 102 can free some of the processing capabilities of the watcher 103 for other purposes. An example of 'other purposes' could be fulfilling core functions of a presence aware application, such as media sharing in an instant messaging application.

The PAL 102 may also process presence information on behalf of multiple applications or services that might otherwise redundantly perform the same presence information processing. That is, multiple applications or services might reside on or be available to the watcher 103, and each might have the capability to request, receive, and process presence information. Many of the steps that the applications or services take with regard to the presence information might be common to several of the applications or services. For example, there may be common presence-related rules or logic that would apply to both an instant messaging service and a push-to-talk service. If the PAL 102 is not present, each of these services might perform the common steps separately. If the PAL 102 is present, the PAL 102 can perform the common steps on behalf of each of these services and then return the results of the processing to the services. This can allow common procedures to occur only one time, thus increasing the efficiency of the watcher 103 and the applications or services it uses.

The PAL 102 can also ensure that indeterminate results are not returned to the watcher 103. As mentioned previously, if the watcher 103 seeks information about a presence aspect for which the presentity 101 has not provided information, the watchers parsing of the presence document to determine that information might be inconclusive. The PAL 102, however, can contain functionality that specifies a definitive response to a presence information request even when information about the requested presence aspect is not available. For example, if the presentity 101 has not specified a willingness or an unwillingness to communicate, and if the watcher 103 submits a request for the presentity's willingness presence aspect, the PAL 102 might provide a default willingness value to the watcher 103. This default value may be associated as part of a rule and may also incorporate a policy type/value. Further, the value of the policy may be set based on the service, or may be changed or overridden by a PAL administrator, a service provider, or some other authorized user principal. In an example, the PAL 102 might indicate that the presentity 101 is unwilling to communicate for an indefinite period of time. In this way, the watcher 103 can be assured of receiving a usable response to any presence information request.

While the above discussion has focused on the PAL 102 providing presence information to the watcher 103 in response to the watcher's request for the current status of that information, the PAL 102 might also provide presence information based on a trigger defined by the watcher 103. That is, the watcher 103 might specify that it wishes to be informed when a change occurs in a presence aspect. When the PAL 102 detects that the specified change has occurred based on established rules and/or context (such as presence context), the PAL 102 can notify the watcher 103 of the change. A trigger might apply to a presence aspect alone or to a presence aspect in combination with one or more applications or services. Applicable triggers may be based on context. In addition, a trigger might be used to receive presence information from a plurality of presentities 101 and/or to provide presence information to a plurality of watchers 103.

As an example, the watcher 103 might have previously determined that the presentity's willingness presence aspect has a value that indicates that the presentity 101 is currently unwilling to communicate. The watcher 103 might wish to know if the presentity 101 becomes willing to communicate at a later point in time. The watcher 103 could establish a trigger on the PAL 102 requesting to be notified of a change in the presentity's willingness presence aspect. The PAL 102 would then monitor the presentity's willingness presence aspect and would inform the watcher 103 if that presence aspect changed from "unwilling" to "willing".

The use of the PAL 102 does not necessarily preclude the presence server 106 sending the presence document to the watcher 103. For example, if the watcher 103 wishes to obtain a large amount of presence information, there may be circumstances in which it is more efficient for the watcher 103 to parse the entire presence document received from the presence server 106 rather than processing multiple individual presence aspect values received from the PAL 102. The PAL 102 provides an upgrade option that might be used to hide complexity from the watcher 103 in some, possibly most or even all, circumstances.

The above discussion was intended to provide sufficient information to promote an understanding of presence information in general and the presence access layer in particular. While the PAL may be employed in various systems (e.g., system 100 shown in FIG. 1) that use presence information, this disclosure does not require a PAL. Other, more generic or more specific systems may work with presence information, for example, as shown in FIG. 2.

Figure 2:
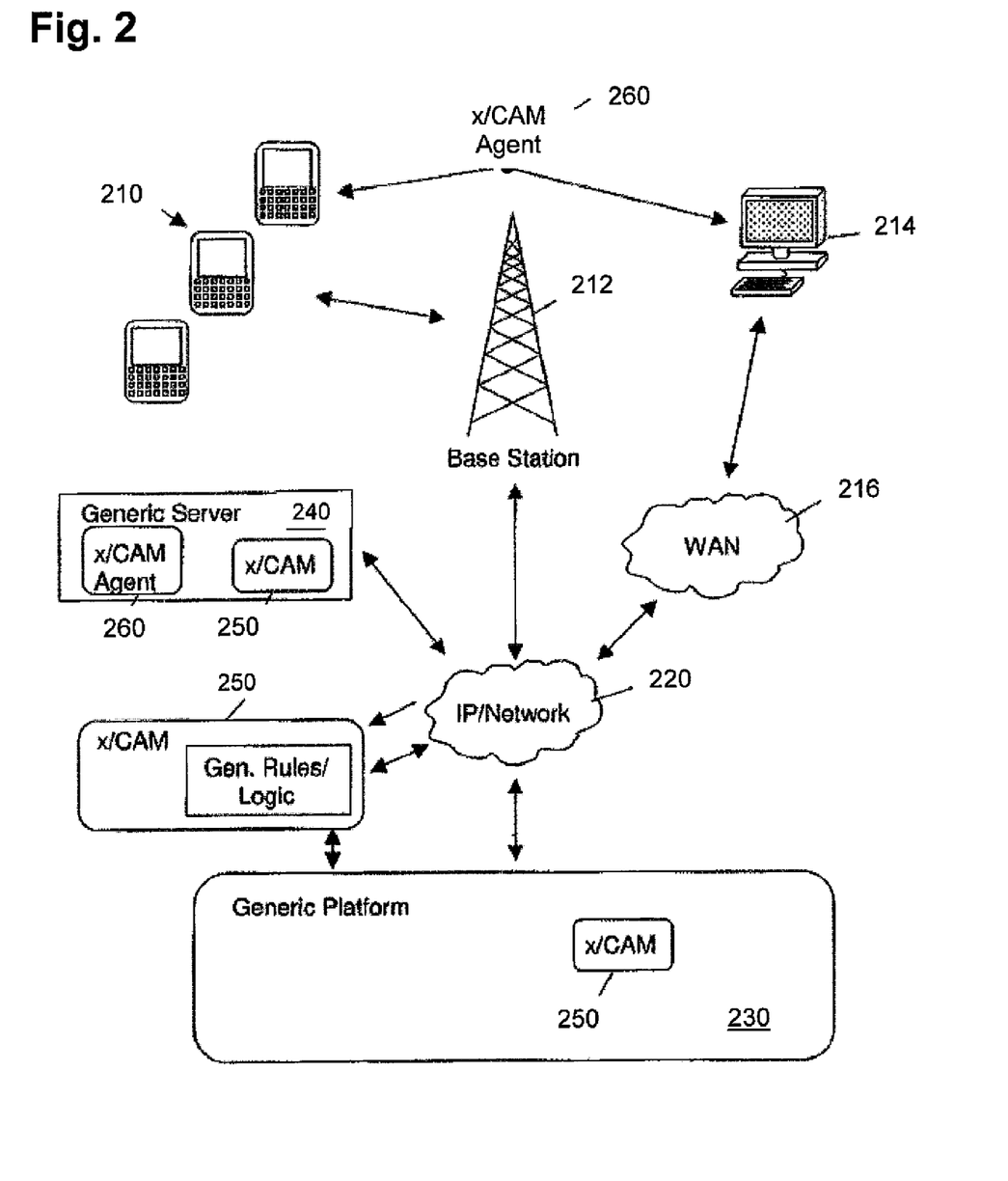
FIG. 2 is a block diagram of a communications system according to an alternative embodiment of the disclosure.

FIG. 2 is a block diagram showing an example system in which a context aware mechanism has been added according to an embodiment of the disclosure. The embodiment shown in FIG. 2 can represent an exemplary implementation of system 100 of FIG. 1. A PAL 102, or p/CAM, is a presence-related x/CAM, with the term x/CAM referring to a more generic context aware mechanism. The x/CAM 250 shown in FIG. 2 may be configured on one or more system elements, possibly distributed as shown in FIG. 2. Additionally, one or more x/CAM agents 260 may be configured on one or more system elements. An x/CAM agent 260 may be self contained software or hardware on a server or a user agent, as opposed to being distributed among multiple systems. x/CAM 250 and x/CAM agents 260 are described further below.

Applications possess functional utilities that have important characteristics known as context. Context is defined as "the set of information which surrounds, and gives meaning to something else." Examples of context can be found, for example, in presence applications, location applications, among others. Context can be quantitatively represented by data stored as one or more files or databases on one or more computer readable medium, such as but not limited to RAM 530, ROM 540, Secondary Storage 550 of FIG. 5, or on a tangible storage medium.

With regard to presence information, presence metadata provides meaning and the presence information is the basis of the context. The meaning is applied to or part of a particular function or a particular feature of a function within an application to establish an appropriate set of processing steps.

Presence context determines what presence information is relevant. For example, if a presence context is for an instant messaging service, that context may establish that only "willingness" and "availability" are significant. In contrast, a presence context for a VoIP (voice over Internet call control) may establish that "willingness" and "contactable" are relevant. Presence context is based on factors such as, but not limited to service identification, identity of the watcher, a group to which the watcher belongs, and others. The resolution for the presence context is what establishes meaning in terms of how presence information is processed.

In one example, an instant message (IM) client application operable on a first users mobile device may require functionality to establish whether other individuals or peers are reachable to permit the first user to initiate an IM chat session. It is also possible that within an IM client, functionalities are required to establish a peer user status icon to represent a second user. In the first scenario, context relates to whether the second user is reachable to initiate a chat. In the second scenario, the first user's IM client discriminates and derives a status icon based on the second user's status and availability to display the correct status icon, indicia or avatar. In the context of the IM client, reachability as it relates to peer status icon feature may not be relevant, whereas reachability is helpful for facilitating the initiated chat function.

The above demonstrates, in a presence environment, that context plays a significant role in computing an individual's presence information to derive presence related aspects, including reachability, availability, among others. As will be appreciated, context also applies in other scenarios besides presence. For example, for a location, a relevant aspect may be based on an underlying "presence aspect" which relates to "who is nearby." This aspect would allow a user on a device to establish whether one of his or her friends is in close physical proximity.

A presence service (such as but not limited to presence server 106 and presence access layer (PAL) 102 of FIG. 1) captures presence information from one or more presence sources (such as but not limited to presentity 101 of FIG. 1). Once this data is collected, a presence service composes or transforms the captured metadata and distributes a raw presence metadata document to authorized watchers (such as but not limited to watcher 103 of FIG. 1). An OMA-Presence service platform is a demonstrative example of a presence service. The OMA-Presence enabler outlines, in detail, semantics and policy related to the publication and consumption of presence information Returning to FIG. 2, user devices 210 communicate through a base station 212 with a network 220. Further, a desktop 214 (e.g., a computing device that is similar or different than user devices 210) communicates through a wide area network 216 with network 220. Also, a generic platform 230 is adapted to store data and states for various devices. Other servers such as a generic server 240 can exist within the network and can communicate over network 220.

The x/CAM 250 may be configured on one or more system elements, distributed as shown in FIG. 2 and as further described below. The x/CAM 250 is adapted to communicate with network 220 and with generic platform 230. In other embodiments, the x/CAM can be located on server 240. In yet further embodiments, the x/CAM can have x/CAM agents 260 that are located on user devices 210 or on server 240, respectively. In still further embodiments, the X/CAM can be part of the generic platform 230. Thus, an x/CAM may be in the generic platform 230, which might be a horizontal platform such as 'presence' (p/CAM) or 'location' (l/CAM) or some other more generic platform. Additionally, an x/CAM located on devices (such as x/CAM agent 260) can be a completely self-contained x/CAM. Still further, an x/CAM agent located on one or more devices could work in concert with any of the x/CAMs shown. Further still, an x/CAM agent 260 located in a server, such as an instant messaging server or server 240, could be provided without x/CAM 250. Additionally, a combination of x/CAM agents and/or x/CAMs could be located in one or more servers (such as a self contained push-to-talk server), such as in generic server 240.

Thus, FIG. 2 illustrates abstracting a platform, whether it be presence, location, generic or a combination of the previous, to a context aware layer using context aware mechanisms or layers to support a multiplicity of application types or enablers. These techniques may be implemented utilizing policies and rules/triggers.

In accordance with one embodiment, a context or mechanism, whether it is presence, location or generic, may include one or more of policies, aspects, rules and triggers. A policy is associated with a particular presence context at an appropriate point in the application life cycle, to specify the behavior or treatment of presence, location or generic related aspects. Policies augment rules/logic flows by the manner in which they operate, to provide a more accurate and meaningful computation of aspects on behalf of a client application or enabler. As will be appreciated, a policy can apply to a class of applications, an individual application or even to a user and can be provisioned with settings regarding a manner in which aspects are computed.

Policy may be expressed using the Open Mobile Alliance (OMA) policy evaluation, enforcement and management (PEEM)/policy expression language (PEL). PEL defines a generic and extensible grammar in which policies may be expressed using a rule set language. PEL is based on Internet Engineering Task Force (IETF) request for comments (rfc) 4745. Conditions and/or actions (as specified in rfc 4745) may be enhanced within the scope of PEEM, through the OMA XDM (XML Document Management) common policy extensions, as detailed in OMA_SUP_XSD_XSD_xdm_extensions_V1_0. The policy can also be expressed as in IETF rfc 4745. As will be appreciated, PEEM is a continuing standards effort by the OMA to define common functions needed by its enablers.

A relevant presence policy, for use by a presence context in the computation of presence aspects, could be an "opt-in-source" policy. This policy may indicate which presence element is an indicator of service opt-in. Two possible values could be "willing" and "ignore." In an embodiment, the default value is "ignore," which indicates that opt-in is not relevant for the given communication service. This exemplary policy, or some other policy, may have applicability to an OMA presence platform. The opt-in-source policy is meant as an example only; other policies are possible based on the needs of a system or user.

By extending common policy actions, x/CAM policies may be incorporated into a common policy PEL 'ruleset' XML document. A 'ruleset' may apply at a user scope or a global scope. For example, the 'ruleset' may apply to a class of service or a specific application. The ruleset may also apply to an individual user or group of users.

x/CAM related policies are referenced, resolved, and/or evaluated through the various PEEM requestor interfaces by the x/CAM server itself or a x/CAM enabled client/agent. That is, application or authentication protocols may provide specific metadata such as the requestor identity to the PEEM requester interface, along with other metadata available to the PEEM servers as the basis for applying rules.

An example of a common policy PEL rule set XML document includes a single rule 'a101'. This rule associates with a service enabler such as a PoC alert and defines specific policy settings/values be applied as a result of a match for a target resource. In this case, the target resource is the service identifier itself. This example makes an intentional correlation between the value of the common policy extension 'ext:service[@enabler]' attribute and the OMA PoC alert service-id as defined by OMA presence.

x/CAMs 250, 255, and 270 from FIG. 2, as well as a PAL (such as PAL 102 of FIG. 1), can be implemented as a computer program product stored on a computer readable medium and executed by one or more processors, such as processing modules or units that are configured in servers or other computers. These x/CAMs can also be implemented as pure hardware or a combination of hardware and software.

Figure 3:
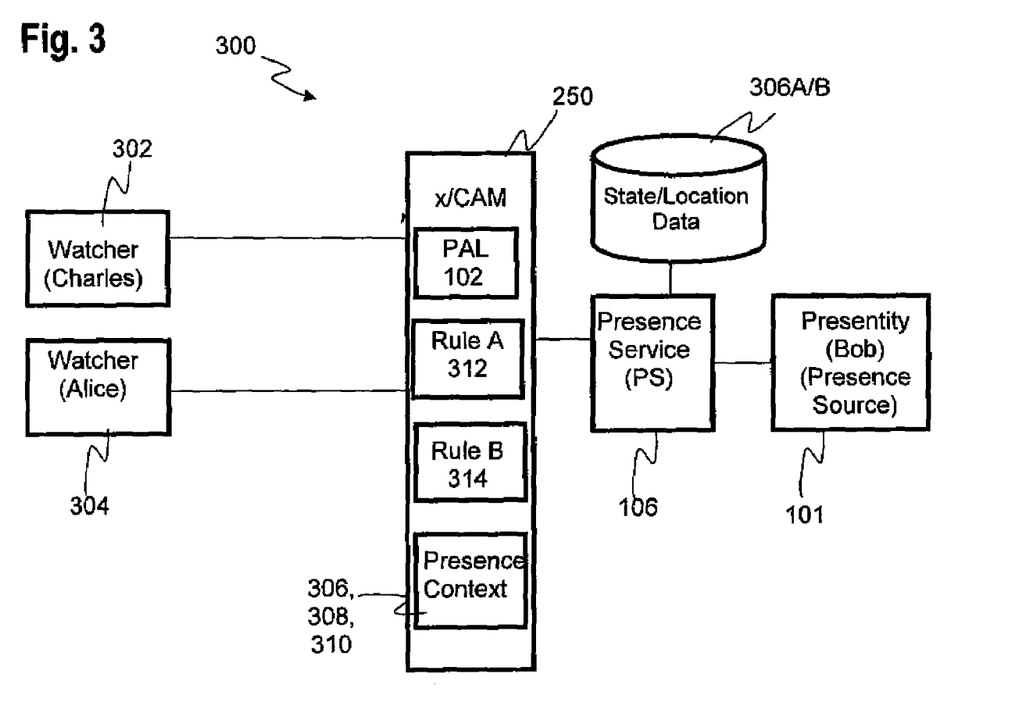
FIG. 3 is a block diagram of a communications system according to an alternative embodiment of the disclosure.

FIG. 3 is a block diagram of a communications system according to an alternative embodiment of the disclosure. The embodiments shown in FIG. 3 are extensions of the embodiments shown in FIGS. 1 and 2; thus, elements common to FIGS. 1 and 2 have similar reference numerals.

System 300 includes presentity Bob 101, watcher Charles 302, watcher Alice 304, and a presence service (PS) 106 (which may be implemented as on or as a server). The system 300 also includes an x/CAM 250, as described with respect to FIG. 2. In some cases, x/CAM 250 may be a PAL 102, as described with respect to FIG. 1. The presence service 106, x/CAM 250, and other features are shown inter-connected and communicating with the presentity 101 and watchers 302 and 304. It should be understood that these systems may be directly or indirectly connected and/or in communication with any other system or entity shown. Further, actions discussed as being performed by any one of the x/CAM 250, PAL, or presence service 106 may be performed by any of these systems or combinations of these systems, in other embodiments.

In an embodiment, each of presentity Bob 101, watcher Charles 302, and watcher Alice 304 are associated with a corresponding presence context. Thus, for example, presentity Bob 101 is associated with presence context Bob 306; watcher Charles 302 is associated with presence context Charles 308; and watcher Alice 304 is associated with presence context Alice 310. The presence context is established by the x/CAM/PAL/PS. Presence context can take the form of data having any suitable data structure, such as but not limited to a list, array, database, or others. In the embodiments described below, presence context takes the form of presence context metadata.

Presence context metadata may be used to specify inputs relating to the establishment of a presence context (306, 308, 310). Presence context metadata can be specified by a presentity or watcher, while other presence context metadata may be determined based on other information sources (e.g. information relating to a presentity or information established by third parties). Presence context metadata can take the form of a list, array, or any other suitable data structure.

While each of presence context Bob 306, presence context Charles 308, and presence context Alice 310 as separate entities, in other embodiments each corresponding presence context could be represented by a single presence context, as shown by the single "presence context" box of FIG. 3. It is possible for a presence context to be unique (to a given system participant), or for system participants to share a common presence context.

A context aware mechanism, such as x/CAM 250, may encounter conflicts during processing of presence data. As described above, conflicts may arise from one of two sources: conflicts among data, and conflicts among rules, policies, or triggers, although conflicts can arise from other sources as well. Conflicts among data may arise due to receiving data from different data sources, each of which provide different values for the same data. Conflicts among rules, policies, or triggers may arise when application of two or more of rules, policies or triggers would give rise to contradictory results or instructions.

In both types of conflicts, one or more criteria may be used to resolve the conflict. The criteria can take a number of different forms and be implemented using a number of different techniques, as described further below. Regardless of the form of the criteria, the context aware mechanism incorporates the criteria into the processing of presence data in order to resolve conflicts and to produce the most current, accurate, and/or desired information. Although the term "criteria" is plural, the term "criteria" is also intended to refer to the singular case.

The criteria can establish a priority according to a number of different guidelines. These guidelines include time, data source, type of data, frequency of reported data, whether the data is "pushed" or "pulled," type of rule, assigned rule priority, user input, user identity, user group, and possibly many other guidelines, as well as combinations thereof. For example, criteria based on time can indicate that more recent data should be given a higher priority. In another example, criteria may be one or more values assigned to a rule to indicate that the rule has a higher or lower priority. Criteria may also be weighted, such that the effect of a given priority can be increased or decreased relative to other priorities. Criteria may be weighted and/or combined with each other during processing.

Criteria may be established or implemented using a number of techniques. For example, criteria may take the form of metadata related to context data associated with a presentity, a watcher, or both. Criteria may take the form of data stored in one or more locations, or may take the form of a rule, policy, and/or trigger. Criteria might also take the form of a modification to a rule. For example, a rule-based criteria could be specified as rule::resolve_location_priority. Criteria may be a combination of rules, policies, and/or triggers. For example, a combination rule/policy-based criteria could be specified as rule::resolve_location_priority_using_policy with policy:: location_priority. Criteria may be transmitted as additional data in a transmission of location data, state data, or any other data. Criteria may take many other forms, or combinations of forms, so long as the context aware mechanism is able to somehow reference and/or use the criteria.

An illustrative example is provided with respect to a data conflict. In an embodiment, presentity Bob 101 provides state data 306A to a context aware mechanism, such as x/CAM 250. The presentity may relay presence data to a presence service, and may relay location state data to a location service (or in another form to a presence service). Location data may be data relating to a last reported location of the presentity. State data may relate to a presentity's state, which in turn may imply a location of the presentity. For example if a presentity's state is "working," the presentity is presumed to be in the office.

The context aware mechanism, such as x/CAM 250, later may be processing state data 306A and location data 306B. However, in this example, the data from the various sources may conflict. For example, state data 306A implies that presentity Bob 101 is in the office, but location data 306B might provide that presentity Bob 101 is in his automobile. Presentity Bob 101 cannot be both in the office and in his automobile, so a conflict arises in while processing state and location data for presentity Bob 101.

The context aware mechanism (x/CAM 250, which may be implemented in some embodiments as a PAL 102) can resolve this conflict by using criteria to resolve the most probable location of presentity Bob 101. The context aware mechanism processes the criteria according to one or more rules, policies, and triggers. For example, the context aware mechanism incorporates the criteria as part of the overall set of data and rules used to process presence data in order to output a reported location and/or availability for presentity Bob 101.

Continuing the above example, if the criteria are based on the data source, then location data 306B might be considered more reliable than state data 306A because location data is derived from a physical device in Bob's personal possession, whereas state data is derived from use of a device associated with Bob. The context aware mechanism might resolve the conflict by selecting data from location data 306B in favor of data from state data 306A.

In an embodiment relating to time, the context aware mechanism might favor data that is more recently acquired. For example, if state data 306A were more recent than location data 306B, then instead state data 306A might be favored over location data 306B. In yet another embodiment relating to a combination of data source and time, the context aware mechanism could assign a first weight to data source and a second weight to time. In this case, the context aware mechanism would take into account a combination of the weighted data source and the weighted time while processing the most likely or plausible location of presentity Bob 101.

In an illustrative example relating to conflicts among rules, policies, or triggers, Rule A 312 provides that presence data should be provided to watchers only during business hours between 9:00 a.m. and 5:00 p.m. Rule B 314 provides that presence data should be provided to watcher Charles 302 every five minutes between 6:30 p.m. and 7:30 p.m. Rule A 312 and Rule B 314 are both in the scope of watcher Charles 302, and are therefore deemed to be in conflict. The rules conflict because Rule A 312 provides that watchers only receive presence data between 9:00 a.m. and 5:00 p.m., but Rule B 314 contradicts this rule with respect to watcher Charles 302 between 6:30 p.m. and 7:30 p.m. However, criteria may be associated with one of Rule A 312 and Rule B 314, with the criteria indicating that in situations where both Rule A 312 and Rule B 314 are in conflict, then Rule B 314 takes priority over Rule A 312. Thus, the conflict will be resolved by implementing Rule B 314 in favor of Rule A 312.

In another embodiment, the context aware mechanism may use criteria to provide different presence information to different watchers. For example, metadata for each of presence context Charles 308 and presence context Alice 310 can have associated criteria. The context aware mechanism can use these criteria to determine that when a data conflict arises that watcher Charles 302 should receive processed presence data using state data 306A, but that watcher Alice 304 should receive processed presence data using location data 306B.

In another embodiment, the criteria may specify that a conflict among two or more of rules, triggers, or policies is to be resolved by processing the rules, triggers, or policies in a particular order. For example, the criteria could specify that Rule A 312 should be processed before processing Rule B 314, or that Rule C should only be processed after processing both Rules A and B.

The embodiments described with respect to FIG. 3 provide a mechanism with which to provide determinate presence aspects to a consumer, such as a watcher. Thus, the embodiments provide for a method or mechanism for providing determinate results.

Figure 4:
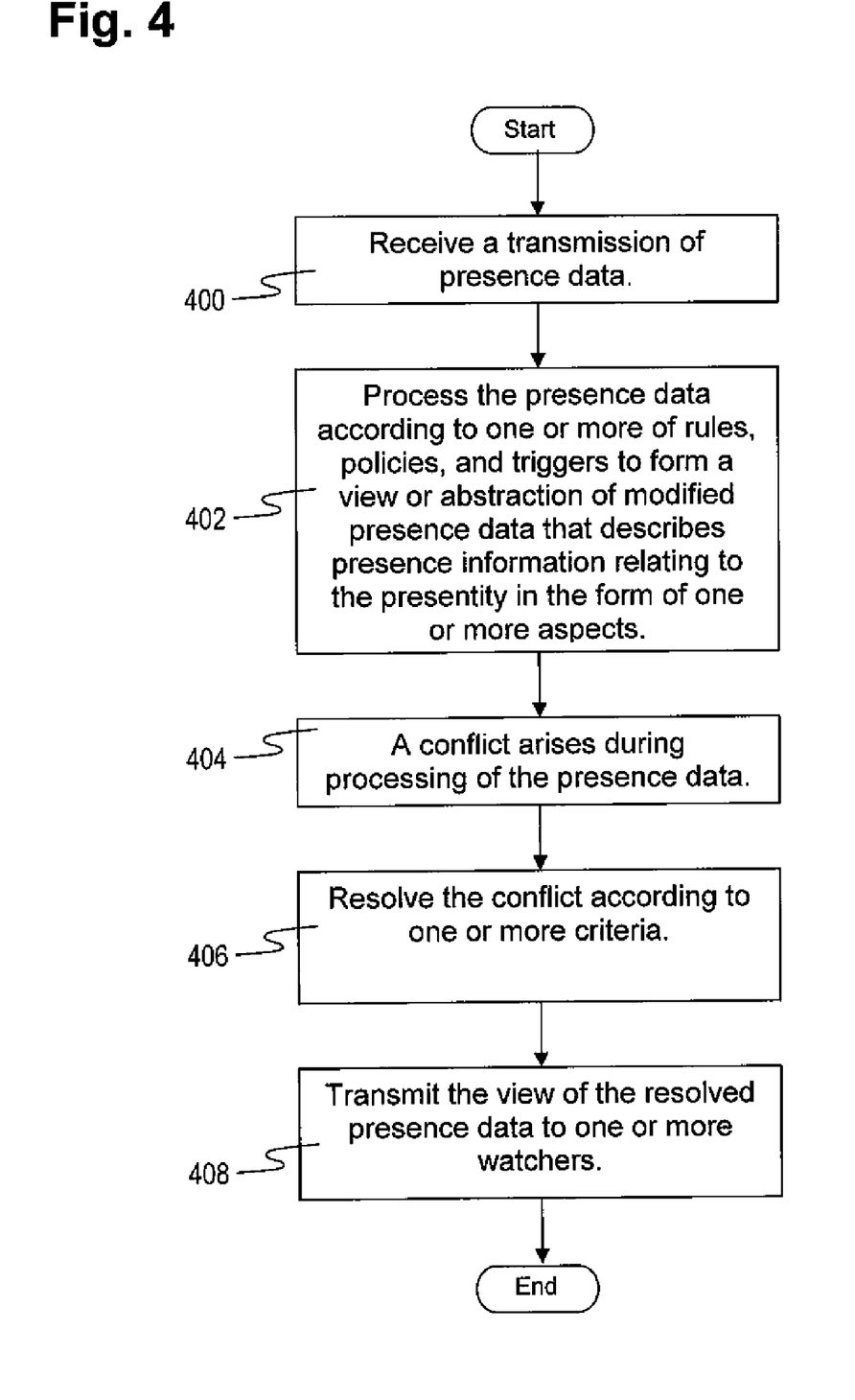
FIG. 4 is a flow chart of a method for processing context data in a presence server according to an embodiment of the disclosure.

FIG. 4 is a flow chart of a method for processing presence context data or metadata in a context aware mechanism according to an embodiment of the disclosure. The context aware mechanism may be implemented by a system, such as that shown in FIG. 5.

The process begins as a transmission of presence data is received (block 400). The presence data may be received from one or more of a presence access layer, a presence server, data sources associated with one or more watchers and/or presentities, or any other appropriate data source. The context aware mechanism processes the presence data according to one or more of rules, policies, and triggers to form a view or abstraction of presence data that describes presence information relating to the presentity in the form of one or more presence aspects (block 402). A conflict arises during processing of the presence data (block 404). The context aware mechanism then resolves the conflict according to one or more criteria (block 406), resulting in a view of the resolved presence data. Optionally, the context aware mechanism may transmit the view of the resolved presence data to one or more watchers (block 408). In an embodiment, after resolving the conflict, presence aspect(s) are transmitted to the watcher.

In another embodiment, the conflict occurs between two or more of rules, policies, and triggers. In this case, the criteria specify the manner in which of the two or more rules, policies, and triggers are used or applied during processing. For example, the criteria could specify selecting one rule in favor of another rule. In another example, the criteria could specify weighting conflicting rules and then taking both conflicting rules into account during processing. Other priorities, selection, or conflict resolution logic could be specified to provide different techniques for processing conflicting rules, policies, and/or triggers. The criteria may be a modification to one or more of the rules, policies, and triggers.

In another embodiment, the presence data comprises first presence data and second presence data. In this case, the conflict occurs between the first presence data and the second presence data. The criteria specify the manner in which the first presence data and the second presence data are used during processing. For example, the first presence data may be associated with a first criteria and the second presence data may be associated with a second criteria. Resolving could then include comparing the first criteria and the second criteria. Based on the comparison, one set of presence data may be selected in favor of the other, or the data could be weighted and combined during processing. In an embodiment, the first criteria and the second criteria are selected from the group consisting of user identifiers, group identifiers, service types, location identifiers, time identifiers, types of data inputs, and combinations thereof.

The first criteria could be a first user identifier of a first watcher and the second criteria could be a second user identifier of a second watcher. In this case, different presence data may be provided to the first watcher than is provided to the second watcher, depending upon a rule that is associated with the first user identity and/or the second user identity. The criteria may be metadata associated with at least one of the first presence data and the second presence data.

Another means of establishing priority is a heuristic mechanism from within the x/CAM 250 itself. Through the consolidation of information, and the digestion of one or more set of specified priorities or criteria, such as physical location versus presence reported location, it is possible for the x/CAM 250 to apply learning to resolve conflicts with other elements. In the case of physical versus presence reported location, this may be extrapolated to elements a data service captures with respect to physical network availability versus reported availability. Further, the x/CAM 250 may apply statistical analysis to conflict resolution. For example, the most probable outcome in which an observer would be interested could be based on the most common or popular priority attribution assigned by other users.

Figure 5:
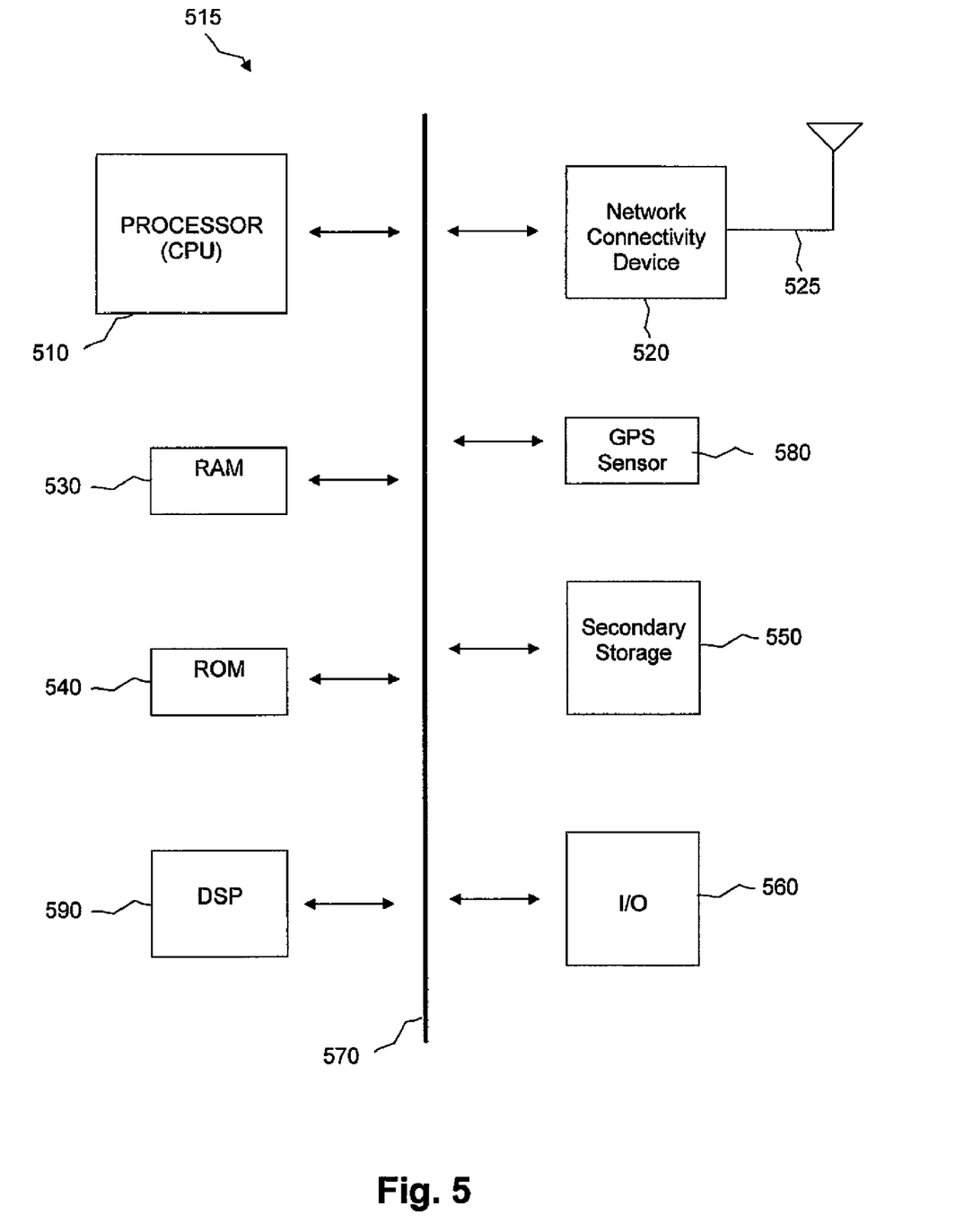
FIG. 5 illustrates a system that includes a processing component of a device, such as a user agent, suitable for implementing one or more embodiments disclosed herein.

The UA and other components described above might include a processing component that is capable of executing instructions related to the actions described above. FIG. 5 illustrates an example of a system 500 that includes a processing component 510 suitable for implementing one or more embodiments disclosed herein. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 570. These components might communicate with one another via a bus 570. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the drawing, such as a digital signal processor (DSP) 502. Although the DSP 502 is shown as a separate component, the DSP 502 might be incorporated into the processor 510.

The processor 510 executes instructions, codes, computer programs, or scripts that it might access from the network connectivity devices 520, RAM 530, ROM 540, or secondary storage 550 (which might include various disk-based systems such as hard disk, floppy disk, SIM (subscriber identity module) card, or optical disk, or other storage device). While only one CPU 510 is shown, multiple processors may be present. Thus, while instructions may be discussed as being executed by a processor, the instructions may be executed simultaneously, serially, or otherwise by one or multiple processors. The processor 510 may be implemented as one or more CPU chips.

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or to which the processor 510 might output information. The network connectivity devices 520 might also include one or more transceiver components 525 capable of transmitting and/or receiving data wirelessly.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for non-volatile storage of data or as an over-flow data storage device if RAM 530 is not large enough to hold all working data. Secondary storage 550 may be used to store programs that are loaded into RAM 530 when such programs are selected for execution.

The I/O devices 560 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 525 might be considered to be a component of the I/O devices 560 instead of or in addition to being a component of the network connectivity devices 520.

A context aware mechanism including a processor configured to receive presence data relating to at least one of a presentity and a watcher, and to resolve a conflict that arises during processing of the presence data according to a criteria.

A computer-implemented method including receiving presence data from at least one of a presentity and a watcher, identifying conflict during processing of the presence data, and resolving the conflict according to a criteria While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computing device comprising:
   a network connectivity device configured to receive presence information from a presence server, the presence information relating to at least one of a presentity and a watcher; and
   a processor configured for:
   processing of the presence information to determine a value of a presence aspect, the presence aspect representing a combination or consolidation of data elements of the presence information received from the presence server;
   identifying a conflict in the presence information, based on the value of the presence aspect being inconclusive or indeterminate, during processing of the presence information wherein the conflict occurs either between first and second presence information received from the presence server or between first and second rules;
   resolving the conflict according to a criteria comprising at least one of a rule, a policy, a trigger, a priority, an order of resolution, and a guideline; and
   according to the resolving, transmitting a first value of the presence aspect to a first watcher and transmitting a second value of the presence aspect to a second watcher, the first and second values being different,
   wherein the presentity comprises a first entity that has first presence information associated with it, and wherein the watcher comprises a second entity that wishes to receive the first presence information associated with the presentity.

2. The computing device of claim 1 wherein the conflict occurs between two or more of rules, and wherein the criteria specifies which one rule is used.

3. The computing device of claim 2 wherein the criteria is specified by a modification to one or more of the rules, policies, and triggers.

4. The computing device of claim 3 wherein the one or more of the rules, policies, and triggers comprise a first rule and a second rule, and wherein the criteria specifies that one of the first rule and the second rule is to be applied only after the other one of the first rule and the second rule is applied.

5. The computing device of claim 1 wherein the criteria specifies which of the first presence information and the second presence information are used.

6. The computing device of claim 5 wherein the first presence information is associated with a first criteria, wherein the second presence information is associated with a second criteria, and wherein resolving comprises comparing the first criteria and the second criteria.

7. The computing device of claim 6 wherein the first criteria and the second criteria are selected from the group consisting of user identifiers, group identifiers, service types, location identifiers, time identifiers, types of data inputs, and combinations thereof.

8. The computing device of claim 7 wherein the first criteria comprises a first user identifier of the first watcher and the second criteria comprises a second user identifier of the second watcher, wherein the
   transmitting is performed based on a rule or a policy associated with one or more of the first user identity and the second user identity.

9. The computing device of claim 5 wherein the criteria comprises metadata associated with at least one of the first presence information and the second presence information.

10. The computing device of claim 1, wherein the criteria specifies one or more of a priority, a rank, or an order used to resolve the conflict.

11. The computing device of claim 10, wherein when the conflict relates to a data conflict, the criteria specifies the priority, order, or rank associated with the conflicting data which is used to resolve the conflict.

12. A computer-implemented method comprising:
   receiving presence information from a presence server, the presence information relating to at least one of a presentity and a watcher;
   processing the presence information to determine a value of a presence aspect, the presence aspect representing a combination or consolidation of data elements of the presence information received from the presence server;
   identifying a conflict in the presence information, based on the value of the presence aspect being inconclusive or indeterminate, during processing of the presence information, wherein the conflict occurs either between first and second presence information received from the presence server or between first and second rules;

resolving the conflict according to a criteria comprising at least one of a rule, a policy, a trigger, a priority, an order of resolution, and a guideline; and according to the resolving, transmitting a first value of the presence aspect to a first watcher and transmitting a second value of the presence aspect to a second watcher, the first and second values being different, wherein the presentity comprises a first entity that has first presence information associated with it, and wherein the watcher comprises a second entity that wishes to receive the first presence information associated with the presentity.

13. The computer-implemented method of claim 12 wherein the conflict occurs between two or more of rules, and wherein the criteria specifies which one rule is used.

14. The computer-implemented method of claim 12 wherein the criteria is specified by a modification to one or more of the rules, policies, and triggers.

15. The computer-implemented method of claim 14 wherein the one or more of the rules, policies, and triggers comprises a first rule and a second rule, and wherein the criteria specifies that one of the first rule and the second rule is to be applied only after the other one of the first rule and the second rule is applied.

16. The computer-implemented method of claim 12 wherein the criteria specifies which of the first presence information and the second presence information are used.

17. The computer-implemented method of claim 16 wherein the first presence information is associated with a first criteria, wherein the second presence information is associated with a second criteria, and wherein resolving comprises comparing the first criteria and the second criteria.

18. The computer-implemented method of claim 17 wherein the first criteria and the second criteria are selected from the group consisting of user identifiers, group identifiers, service types, location identifiers, time identifiers, types of data inputs, and combinations thereof.

19. The computer-implemented method of claim 18 wherein the first criteria comprises a first user identifier of the first watcher and the second criteria comprises a second user identifier of the second watcher, and wherein the transmitting is performed based on a rule or a policy associated with one or more of the first user identity and the second user identity.

20. The computer-implemented method of claim 12 wherein the criteria specifies one or more of a priority, a rank, or an order used to resolve the conflict.

21. The computer-implemented method of claim 20, wherein when the conflict relates to a data conflict, the criteria specifics the priority, order, or rank associated with the conflicting data which is used to resolve the conflict.

22. The computer-implemented method of claim 12 wherein the criteria comprises metadata associated with at least one of the first presence information and the second presence information.

23. A non-transitory computer readable medium containing instructions that cause a computing device to perform the operations of:

receiving presence information from a presence server, the presence information relating to at least one of a presentity and a watcher;

processing the presence information to determine a value of a presence aspect, the presence aspect representing a combination or consolidation of data elements of the presence information received from the presence server;

identifying a conflict in the presence information, based on the value of the presence aspect being inconclusive or indeterminate, during processing of the presence information, wherein the conflict occurs either between first and second presence information received from the presence server or between first and second rules;

resolving the conflict according to a criteria comprising at least one of a rule, a policy, a trigger, a priority, an order of resolution, and a guideline; and according to the resolving, transmitting a first value of the presence aspect to a first watcher and transmitting a second value of the presence aspect to a second watcher, the first and second values being different, wherein the presentity comprises a first entity that has first presence information associated with it, and wherein the watcher comprises a second entity that wishes to receive the first presence information associated with the presentity.

* * * * *